United States Patent
Mele et al.

(10) Patent No.: US 10,188,999 B2
(45) Date of Patent: Jan. 29, 2019

(54) PROCESS FOR ENCAPSULATING A LIQUID

(71) Applicant: Fondazione Istituto Italiano di Tecnologia, Genoa (IT)

(72) Inventors: Elisa Mele, Castrignano Dei Greci (IT); Ilker S. Bayer, Genoa (IT); Pier Paolo Pompa, Lecce (IT); Gabriele Maiorano, S. Cesarea Terme (IT); Athanasia Athanasiou, Ceranesi (IT); Roberto Cingolani, Ceranesi (IT)

(73) Assignee: Fondazione Istituto Italiano di Technologia, Genoa (IT)

( * ) Notice: Subject to any disclaimer, the term of this patent is extended or adjusted under 35 U.S.C. 154(b) by 127 days.

(21) Appl. No.: 15/104,602

(22) PCT Filed: Dec. 16, 2014

(86) PCT No.: PCT/IB2014/066964
§ 371 (c)(1),
(2) Date: Jun. 15, 2016

(87) PCT Pub. No.: WO2015/092678
PCT Pub. Date: Jun. 25, 2015

(65) Prior Publication Data
US 2016/0325258 A1 Nov. 10, 2016

(30) Foreign Application Priority Data
Dec. 18, 2013 (IT) ................. TO13A01037

(51) Int. Cl.
*B01J 13/04* (2006.01)
*B01J 13/22* (2006.01)
(52) U.S. Cl.
CPC ............. *B01J 13/04* (2013.01); *B01J 13/22* (2013.01)
(58) Field of Classification Search
CPC ...................................................... B01J 13/04
See application file for complete search history.

(56) References Cited

U.S. PATENT DOCUMENTS

| 3,393,155 A | 7/1968 | Schutte et al. |
| 3,951,824 A | 4/1976 | Maxson et al. |
| 6,290,941 B1 | 9/2001 | Lahanas et al. |
| 7,030,071 B2 | 4/2006 | Hoffman et al. |
| 2011/0151586 A1* | 6/2011 | Chen ............. B22F 1/0062 436/531 |
| 2014/0086828 A1* | 3/2014 | Foster ............ A61K 31/7088 424/1.17 |

FOREIGN PATENT DOCUMENTS

| EP | 0313348 B1 | 1/1995 |
| WO | 2004/018078 A1 | 3/2004 |
| WO | 2009/011658 A1 | 1/2009 |

OTHER PUBLICATIONS

Biomimetic Approach for Liquid Encapsulation with Nanofibrillar Cloaks, Mele et al., Langmuir, 2014, vol. 30, 2896-902.*
Database WPI, "XP-002728214", Thomson Scientific, 2012, pp. 1-2.
International Search Report and the Written Opinion, Application No. PCT/IB2014/066946 filed Dec. 16, 2014, dated Mar. 31, 2015.

* cited by examiner

*Primary Examiner* — Irina S Zemel
(74) *Attorney, Agent, or Firm* — MacMillan, Sobanski & Todd, LLC

(57) ABSTRACT

Globular microstructures comprising a liquid core and a solid shell that envelops the core comprising polymeric micro- or nanofibers, preferably obtained by electrospinning, comprising a hydrophobic polymer or a mixture of hydrophobic polymer with polymers derived from cellulose or with polyacrylates; the microstructures may have a further coating of nanoparticles or polymeric coating. The microstructures have applications similar to those of "liquid marbles" with improved mechanical properties.

16 Claims, 1 Drawing Sheet

PROCESS FOR ENCAPSULATING A LIQUID

Figure 1:
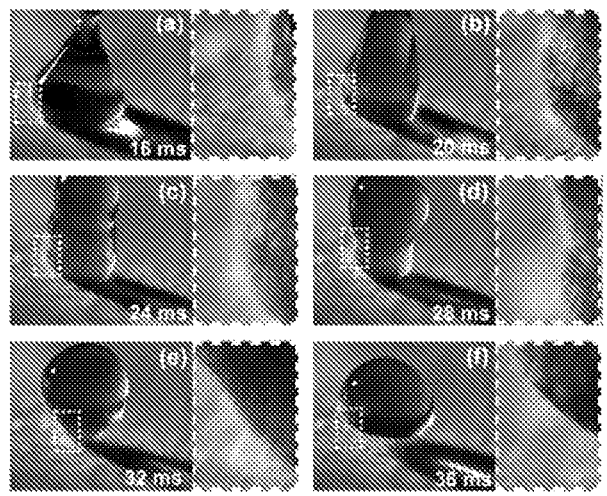
Figure 2:
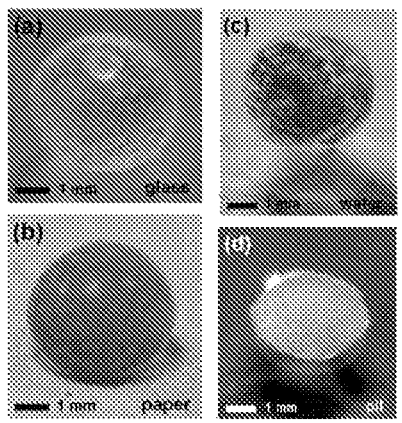

This is a national stage application filed under 35 U.S.C. § 371 of international application PCT/IB2014/066964, filed under the authority of the Patent Cooperation Treaty on Dec. 16, 2014, published; which claims the benefit of Patent Application No. TO2013A001037, filed on Dec. 18, 2013. The entire disclosures of all the aforementioned applications are expressly incorporated herein by reference for all purposes.

The present invention relates to a process for the production of globular structures comprising a liquid core in a solid shell that envelops said core and to globular structures, in particular having micro- or nanometric dimensions thus obtained.

The term "liquid marbles" denotes droplets of an aqueous fluid encapsulated with hydrophobic particles. These liquid marbles behave like solid particles to a certain extent, but since their structural form is governed by the surface tension, they display unusual properties, including in particular an extremely small area of contact with surfaces, giving rise to rolling with low friction and to superhydrophobic interactions with other fluids.

In particular, encapsulation of liquids has been achieved using micro- and nanoparticles and hydrophobic powders, for example using polymer particles such as poly(tetrafluoroethylene), polyethylene, polyvinylidene fluoride, particles of silica, of hydrophobized copper and of graphite.

Although the term "liquid marbles" was introduced relatively recently, it has long been known that mixing of a liquid with a fine powder, typically in conditions of high shear stress, is able to form a product consisting of droplets of liquid encapsulated with a shell of fine powders.

U.S. Pat. No. 3,393,155 describes droplets of an aqueous liquid encapsulated with pyrogenic silica.

U.S. Pat. No. 3,951,824 describes a composition of a drilling fluid prepared by combining hydrophobic silica and water in conditions of high shear stress to form a product that is in the form of a fluid dry powder.

U.S. Pat. No. 6,290,941 relates to pharmaceutical or cosmetic compositions that comprise silica particles with a hydrophobic coating, in which water and a water-soluble polymer are incorporated.

U.S. Pat. No. 7,030,071 describes a solid powder formed from a solution of detoxifying agent encapsulated in hydrophobic nanoparticles.

WO 2009/011658 describes hollow microspheres having a porous wall consisting of nanofilaments of various kinds, including metal oxides and sulphides and hydrophilic or hydrophobic polymers, obtained by spray drying a suspension of surfactant and nanofilaments.

The present invention supplies new globular structures, structurally similar to liquid marbles, comprising a liquid core and a solid shell that envelops the core, which display better properties and moreover properties not attainable with globular structures, such as liquid marbles provided with a particulate covering.

Thus, the invention relates to globular structures and a process for preparation thereof, as defined in the claims that follow.

The globular structures according to the invention are characterized in that they have a liquid core enveloped in a covering comprising polymeric micro- or nanofibres, preferably obtained by electrospinning.

These globular structures, also called "fibre-coated drops" hereinafter, may be obtained by causing the impact and rolling of drops of a liquid, in particular of water or of an aqueous solution, on a mat of fibres obtained by electrospinning having engineered morphology and wettability properties. By controlling the chemical composition of the fibres and the velocity of impact of the drops, the entire volume of liquid can be enveloped in a fibrous network, creating a sphere with a liquid core with low rolling friction and high mechanical strength; the fibre covering typically has a thickness greater than or equal to 50 μm and is impermeable to water.

The term "fibres" is to be understood as referring in particular to fine, filiform and one dimensional structures; fibres having an aspect ratio between $10^3$ and $10^6$ are preferred.

By using fibres, instead of the powders or particles typically used for producing liquid marbles, the mechanical strength properties of the system thus obtained are improved, creating novel structures that are solid, soft, non-wettable, with increased structural strength (both in air and in a liquid environment) relative to liquid marbles. Moreover, this approach offers numerous possibilities as the properties of the fibres may be modified by incorporating functional particles, active molecules and drugs. Furthermore, it is possible to obtain a fibrous solid covering that is much thinner than the coverings obtained with micrometric particles. In contrast to the conventional liquid marbles, the continuous network of fibres may be removed mechanically from the surface of the encapsulated liquid. The fibrous coating then functions as a cloak that may be removed, leaving the liquid volume accessible, and then repositioned to cover the liquid again. This cloak of fibres may also be coated externally with nanomaterials (such as graphene sheets, nano-clay sheets, luminescent, conductive, or magnetic nanoparticles) or with a polymer coating (e.g. elastomers dissolved in suitable solvents), for the purpose of obtaining a cloak with specific mechanical, optical and electrical properties.

The process for preparing the fibre-coated drops envisages production of a mat of fibres, typically obtained by electrospinning; the electrospinning technique, which is known per se, uses a strong electric field for creating fibres with a diameter that varies from a few nanometres up to values above 1 μm, for example from 10 nm to 10 μm.

The electrospinning equipment comprises a syringe filled with the polymer solution, a syringe pump, a source of high voltage and a collector. The metallic needle of the syringe has the function of an electrode for inducing electric charges in the solution, under the influence of a strong electrostatic field. When the charge repulsion exceeds the surface tension of the polymer solution there is formation of a charged polymer jet that is accelerated towards the collector. During flight of the jet, the solvent evaporates and the nanofibres are collected on the collector.

For production of the fibre-coated drops, liquids such as water and aqueous solutions are generally used; however, the invention is not limited to aqueous liquids.

The polymer fibres used must not, however, be wettable by the liquid, i.e. the surface tension of the liquid must be greater than the "critical wetting surface tension" of the fibres; preferably, the difference between the surface tension of the liquid and the CWST of the fibres should be greater than 10 dyn/cm, more preferably greater than 40 dyn/cm.

An empirical method for determining the CWST of fibres is described in WO 2004/018078 (pages 2 and 3, incorporated by citation) and in EP-A-0 313 348 (page 6).

For example, when using water (surface tension 72 dyn/cm) or aqueous solutions, hydrophobic polymer fibres are used, preferably with CWST below 60 dyn/cm, preferably below 40 dyn/cm.

In a specific embodiment, hydrophobic nanofibres were produced with a water contact angle (WCA) of about 150° using perfluorinated acrylic polymers, which are commercially available and relatively economical, for example the polymer Capstone ST 100® from DuPont, marketed in the form of an aqueous dispersion. Fibres obtained by electrospinning from this polymer are suitable for encapsulating drops of water and aqueous solutions according to the invention.

Typically, drops of liquid are used with a volume of less than 100 μl. When these water droplets are caused to impact on the surface of the fibrous substrate, the nanofibres are pulled out of the substrate (mat) and are collected on the surface of the drop. For this purpose, it is important that the mat of fibres obtained by electrospinning is formed from fibres that are not strongly intertwined with one another or at least partially are not intertwined, so that surface layers may easily be detached from the electrospinning mass.

In the initial phase of the process (i.e. within about 40 ms from impact), the drop is only partially coated with the nanofibres, as the area of contact between the liquid and the fibres is limited to the region of extension of the drop. After impact, the drop rolls on the fibrous mat, collecting bundles of fibres. When the drop stops, it is advisable to provide a light shaking of the substrate on which the mat is deposited to cause further rolling of the drop, allowing additional detachment of fibres and the final covering of the whole volume of the drop. At the end of the process (which may take about 5 seconds), the drop is completely enveloped in a coating of nanofibres.

Particularly when using drops and water or aqueous solutions, hydrophobic polymers are used, such as fluorinated polymers, more preferably perfluorinated acrylic polymers (preferably of medium molecular weight) and polyvinylidene difluoride polymer, optionally mixed with other polymers, such as in particular cellulose derivatives, cellulose nitrate and acrylate polymers, for example alkyl cyanoacrylates such as ethyl cyanoacrylate, poly(methylmethacrylate), poly(ethylmethacrylate), octyl cyanoacrylate.

By using polymer mixtures it is possible to modify and control the wettability properties and the mechanical properties of the fibres obtained by electrospinning, allowing fibre-coated drops to be obtained with different and variable structural mechanical robustness. In particular, it is preferable to use polymer mixtures of the aforementioned fluorinated polymers with the aforementioned cellulose derivative polymers and acrylate polymers, in which the content of fluorinated polymer is from 30 to 90 wt % relative to the total weight of the polymer mixture. For example, drops of water coated with fibres of the pure polymer Capstone ST 100® or obtained from a mixture of said polymer with 10 wt % of cellulose acetate had low mechanical strength and were able to withstand a compressive force of about 0.1 mN.

With increase in the content of cellulose acetate, there was an increase in mechanical strength; for example, with fibre mats containing 70% of cellulose acetate and 30% of Capstone ST 100®, fibre-coated drops were obtained that were able to withstand, a compressive force of 12 mN.

The fibre-coated drops thus obtained prove to be stable on various types of substrate, such as glass, paper, aluminium and other metals or plastics and are able to float on water and on viscous fluids.

Fibre-coated drops that are able to float displayed a long life (2-3 hours) without collapsing or bursting when deposited on an interface of water or oil. In these cases only a gradual reduction in volume is observed, due to evaporation of the liquid inside the fibrous covering. Moreover, the fibre-coated drops remain stable even when they are forcibly immersed in silicone oil, and they were not observed to collapse through bursting after coming into contact with the bottom of the glass container.

In the appended drawings:

FIG. 1 comprises a series of micrographs that illustrate the formation of a fibre-coated drop; the images are recorded with a high-speed camera at 4000 fps and relate to a 30-μl drop of water that impacts at a velocity of 0.8 m/s on a surface of a fibrous mat of Capstone® polymer with a time that ranges from 16 to 36 ms (photographs (a)-(f)); the insert photographs are enlargements that demonstrate extraction of the fibres from the substrate so that they are collected on the surface of the drop;

FIG. 2 relates to micrographs of fibre-coated drops deposited on various substrates: (a) glass, (b) paper, (c) floating on water and (d) on silicone oil.

EXAMPLE 1

The polymer Capstone ST 100® is commercially available as an aqueous dispersion having high water repellency. Production of nanofibres of this polymer is not reported in the scientific literature, presumably because the original aqueous formulation is not suitable for electrospinning. For the purposes of the invention, with the aim of obtaining fibres by electrospinning, the fluoroacrylic resin was extracted from the aqueous dispersion and the resin thus separated was then dissolved in acetone.

Solutions of Capstone ST 100® in acetone were obtained by a two-step process. First the polymer was extracted from the original aqueous dispersion by mixing equal volumes of Capstone® and of trifluoroacetic acid (TFA). The precipitated polymer was washed in water in order to remove the acid residues and was then dissolved in acetone at a concentration of 20 wt %.

A plastic syringe with a stainless steel 23-gauge needle was filled with the solutions obtained and was connected to a syringe pump operating at a flow rate of 3 $mlh^{-1}$. The solutions were electrospun at a voltage of 20 kV, controlled using a high-voltage power supply. The fibres were collected on an aluminium foil placed at a distance of 15 cm from the needle. A 30-μl drop was released from a height of about 1-5 cm onto the surface of the fibrous substrate of Capstone®.

After impact, the drop spread over the surface, forming a circular lamella, and continued to change shape, moving upwards and eventually becoming detached from the fibrous mat. After bouncing off from the surface, the drop fell back onto the mat, rolling and collecting the nanofibres. Further shaking of the substrate promotes complete covering of the water drops.

EXAMPLE 2

The mechanical and chemical properties of the fibre-coated drops can be modified using composite fibres. For example, combined solutions of Capstone® and cellulose acetate in acetone were used. The cellulose acetate was dissolved in acetone beforehand to obtain a solution with a content of 15 wt % of cellulose acetate relative to acetone.

Fibres were prepared by electrospinning with various amounts of cellulose acetate in Capstone®, i.e. with a content of 10, 60 and 70 wt % of CA relative to the sum of CA and Capstone®. These fibres were tested for encapsulation of water, according to the procedures given in example 1.

EXAMPLE 3

Other cellulose derivatives, such as ethylcellulose and cellulose nitrate, can be mixed with Capstone® to control the properties of the final fibrous covering.

EXAMPLE 4

Fibre-coated droplets were obtained using fibres from electrospinning containing Capstone® and ethyl cyanoacrylate (ECA). Solutions of Capstone® and ECA in acetone were used, where the two polymers were mixed at various concentrations with a content of ECA in Capstone® less than 50 wt %.

EXAMPLE 5

Other acrylate polymers may be combined with Capstone® or other fluoroacrylic polymers, for example poly (methylmethacrylate), poly(ethylmethacrylate) and octyl cyanoacrylate.

EXAMPLE 6

Fibre-coated droplets were further coated with a thin film of graphene. For this purpose, graphene powder was dispersed beforehand in hexane (concentration 1-5%) and a drop of this solution was deposited on the volume of water held by the fibres. After complete evaporation of the hexane (a few seconds), the droplet is then held both by the fibres and by a thin layer of graphene. This layer makes the fibrous coating more compact and can also be removed mechanically from the liquid surface. Moreover, it can be positioned on it again, like a cloak. A similar process was also carried out using solutions of elastomeric polymers in hexane, which polymerize when exposed to environmental moisture, such as Elastosil RTV. In this case solutions of Elastosil (1-5%) in hexane were used.

According to a characteristic feature of the invention, the fibre-coated drops may be made using mats of polymer microfibres including other active and functional agents, such as essential oils, drugs, metal precursors, metals, semiconducting or organic nano- and microparticles, photochromic or electrochromic molecules, so as to give the coating fibres the desired functionalities.

Liquids that can be encapsulated comprise not only the aforementioned water and aqueous solutions, but also physiological solutions, liquid cell culture media and solutions of water-soluble polymers, aqueous dispersions, solutions of optically active molecules, drugs in the liquid state.

Moreover, the procedure described may be used for encapsulating liquids that are not water-based, such as oily substances (silicone oil, olive oil and other mineral and vegetable oils) or mixtures thereof In the case when the oil is encapsulated in the membrane of nanofibres, the resultant "fibre-coated drops" may have either a spherical shape or may be elongated in a particular direction. In particular, production of structures of ellipsoidal, spheroidal or cylindrical shape has been observed.

A particular embodiment relates to encapsulation of solutions of nanomaterials for applications as a fiducial marker for stereotactic radiosurgery systems.

In this case, the globular microstructures consist of a solution, aqueous or otherwise, of metallic nanoparticles, preferably aqueous solutions of gold (Au) nanoparticles.

The dimensions of the nanoparticles are from 1 nanometre to 1000 nanometres, preferably with dimensions between 50 and 200 nanometres.

The concentration of nanoparticles is typically greater than 1 mg/mL, preferably greater than 50 mg/mL.

The nanoparticles in solution are stabilized by surfactants and/or polymers and/or capping agents, for example:

Polyethylene glycol CAS 25322-68-3, and monofunctionalized derivatives of polyethylene glycol (for example methoxypolyethylene glycol amine CAS 80506-64-5, polyethylene glycol 2-mercaptoethyl methyl ether CAS 134874-49-0) and bifunctionalized derivatives of polyethylene glycol (homo-bifunctionalized, for example polyethylene glycol diamine CAS 24991-53-5, and hetero-bifunctionalized, for example polyethylene glycol 2-mercaptoethylmethyl ether acetic acid CAS165729-81-7);
Polyvinylpyrrolidone CAS 9003-39-8;
Hexadecyltrimethylammonium bromide CAS 57-09-0;
Hexadecyltrimethylammonium chloride CAS 112-02-7;
Sodium dodecyl sulphate CAS 151-21-3;
Dodecyltrimethylammonium bromide CAS 1119-94-4;
Dodecyltrimethylammonium chloride CAS 112-00-5;
Polyvinyl alcohol CAS 9002-89-5;
n-Dodecyl mercaptan CAS 112-55-0;
Bovine serum albumin CAS 9048-46-8;
Tannic acid CAS 1401-55-4;
preferably negatively charged compounds of natural origin.

In a typical example of manufacture, the procedure for encapsulation of the solution of AuNPs corresponds to that described above. However, the solution of AuNPs is instead prepared as follows: AuNPs of approx. 100 nm are synthesized by seed-mediated growth (using, as seeds, 15-nm gold particles capped with citrate, synthesized by procedures of the Turkevich-Frens type). After synthesis, the particles are stabilized by adding a suitable amount of tannic acid (for example from 1 to 500 micromolar), and are then concentrated by repeated centrifugation until a concentration preferably >50 mg/ml is reached. These solutions are stable for months even in ambient conditions, and are used as they are for encapsulation in fibres from electrospinning, by means of the general procedure already described.

Owing to the extremely high concentration of the AuNPs, the spheres thus produced have high contrast in X-ray imaging, finding application as a fiducial marker for use in applications of Stereotactic Radiosurgery (SRS), and in particular as a fiducial marker for radiosurgical treatment by means of CyberKnife® instrumentation.

The fibre-coated drops according to the invention may in general find application in all the applications previously known and used for liquid marbles; these comprise the production of sensors, (liquid gas), drug release systems, manipulation and transport of small amounts of liquids, Pickering emulsions, and microreactors.

The invention claimed is:
1. Process for the production of globular microstructures comprising a liquid core and a solid shell that envelops the core, in which said solid shell is impervious to water and is formed from hydrophobic polymeric micro- or nanofibres, the method comprising:
dropping droplets of liquid on a mat of polymeric micro- or nanofibres obtained by electrospinning, and rolling said droplets on said mat of fibres, so as to extract micro- or nanofibres that are not intertwined with one another from said mat and form said shell on the surface of the liquid core.

2. Process according to claim 1, wherein said polymeric fibres are selected from fibres of hydrophobic fluorinated or perfluorinated polymers, and mixtures of said hydrophobic fluorinated or perfluorinated polymers and cellulose derivatives or acrylate polymers.

3. Process according to claim 2 wherein said hydrophobic fluorinated polymer is selected from fluorinated or perfluorinated acrylic polymers and polyvinylidene difluoride.

4. Process according to claim 2, wherein said cellulose derivatives are selected from cellulose acetate, ethylcellulose and cellulose nitrate.

5. Process according to claim 2, wherein said acrylate polymer is selected from ethyl cyanoacrylate, polymethylmethacrylate, polyethylmethacrylate and octyl cyanoacrylate and mixtures thereof.

6. Process according to claim 2, wherein said polymer mixture comprises from 30 to 90 wt % of fluorinated or perfluorinated polymer.

7. Process according to claim 1, wherein said polymeric micro- or nanofibres have an aspect ratio of $10^3$-$10^6$.

8. Process according to claim 1, wherein said polymeric micro- or nanofibres have a diameter from 10 nm to 10 μm.

9. Process according to claim 1, wherein said coating of polymeric micro- or nanofibres is removable.

10. Process according to claim 1, wherein said liquid core is a solution comprising metallic nanoparticles stabilized with surfactant and/or polymers and/or capping agents.

11. Process according to claim 10, wherein said nanoparticles have a size between 50 and 200 nm and are present in solution at a concentration greater than 50 mg/ml.

12. Process according to claim 1, wherein the liquid making up the core comprises an aqueous solution or is a hydrophobic liquid.

13. Globular microstructures comprising a liquid core and a solid shell, impervious to water, formed from hydrophobic polymeric micro- or nanofibres formed by a process according to claim 1.

14. Process according to claim 10, wherein said metallic particles comprise gold nanoparticles.

15. Process for the production of globular microstructures comprising a liquid core and a solid shell that envelops the core, in which said solid shell is impervious to water and is formed from hydrophobic polymeric micro- or nanofibres, the method comprising:
    dropping droplets of liquid on a mat of polymeric micro- or nanofibres obtained by electrospinning, and
    rolling said droplets on said mat of fibres, so as to extract micro- or nanofibres that are not intertwined with one another from said mat and form said shell on the surface of the liquid core;
    wherein said polymeric micro- or nanofibres are further coated externally with particulate nanomaterials or with a polymer coating.

16. Process according to claim 15, wherein nanomaterial is selected from graphene sheets, nano-clay sheets and luminescent, conductive or magnetic nanoparticles or comprises an elastomeric polymer.

* * * * *

UNITED STATES PATENT AND TRADEMARK OFFICE
CERTIFICATE OF CORRECTION

PATENT NO. : 10,188,999 B2
APPLICATION NO. : 15/104602
DATED : January 29, 2019
INVENTOR(S) : Elisa Mele et al.

It is certified that error appears in the above-identified patent and that said Letters Patent is hereby corrected as shown below:

On the Title Page

Please correct the (73) Assignee from:
"Fondazione Istituto Italiano di Technologia"

To:
-- Fondazione Istituto Italiano di Tecnologia --.

Signed and Sealed this
Twenty-sixth Day of March, 2019

Andrei Iancu
*Director of the United States Patent and Trademark Office*